United States Patent [19]

Schell

[11] Patent Number: 5,210,653
[45] Date of Patent: May 11, 1993

[54] EXTERNAL ACTUATOR FOR A DEFORMABLE MIRROR

[76] Inventor: John D. Schell, 1206 Mohican Blvd., Jupiter, Fla. 33458

[21] Appl. No.: 895,486

[22] Filed: Jun. 8, 1992

[51] Int. Cl.$^5$ .............................. G02B 5/08; G02B 7/18
[52] U.S. Cl. ................................... 359/846; 359/849; 310/26; 310/328
[58] Field of Search ............... 359/846, 847, 848, 849; 310/26, 83, 311, 325, 328

[56] References Cited

U.S. PATENT DOCUMENTS

| | | | |
|---|---|---|---|
| 3,229,578 | 1/1966 | Smith | 359/849 |
| 3,628,852 | 12/1971 | Snaper et al. | 359/849 |
| 4,295,710 | 10/1981 | Heinz | 359/849 |
| 4,408,832 | 10/1983 | Hartman et al. | 310/328 |
| 4,438,364 | 3/1984 | Morison | 310/328 |
| 4,601,553 | 7/1986 | Pepi et al. | 359/846 |
| 4,734,557 | 3/1988 | Alfille et al. | 359/847 |
| 4,861,149 | 8/1989 | Ealey | 359/849 |
| 4,940,318 | 7/1990 | Ealey et al. | 359/849 |
| 4,959,567 | 9/1990 | Ealey et al. | 359/849 |
| 4,983,028 | 1/1991 | Derenne et al. | 359/849 |

FOREIGN PATENT DOCUMENTS 2170323 7/1986 United Kingdom ................. 359/846

Primary Examiner—Bruce Y. Arnold
Assistant Examiner—R. D. Shafer
Attorney, Agent, or Firm—Peter R. Ruzek

[57] ABSTRACT

An actuator device of particular use in changing the configuration of a deformable mirror faceplate includes an electrically deformable actuator confined between a back surface of a support and a nut that is threaded onto a threaded end portion of elongated tensioning element that has an end cap secured to the other end portion. The tensioning element passes through a central opening of the actuator and a passage in the support. A spring is interposed between the front surface of the support and the end cap. Tightening of the nut imparts causes the spring to exert its restoring force on the actuator to subject the same to a mechanical preload pressure. Another nut may be threaded onto the threaded end portion of the tensioning element to be received in a corresponding recess of the support and pre-deform the spring in the absence of the actuator.

17 Claims, 1 Drawing Sheet

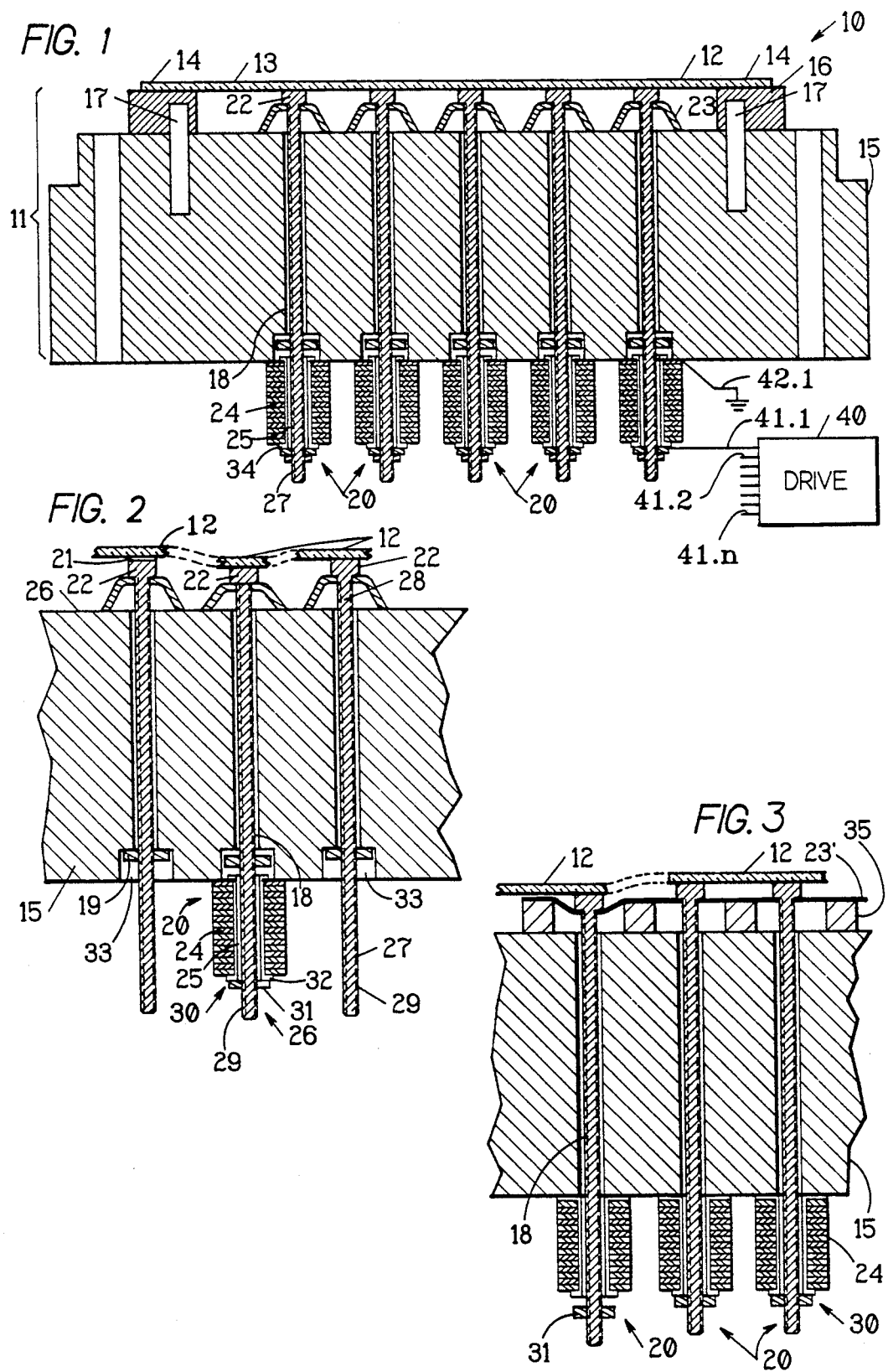

EXTERNAL ACTUATOR FOR A DEFORMABLE MIRROR

DESCRIPTION

1. Technical Field

The field of the invention is that of adaptive optics, including the subfield of deformable mirrors.

2. Background Art

In the field of adaptive optics, an essential component is a mirror including a faceplate that is provided with a reflective surface region and is capable of being deformed in a controlled fashion at any particular time during the use of the deformable mirror to correct for or to introduce phase errors or perturbations in the wavefront of the light beam that impinges on and is being reflected from the reflective surface region of the faceplate, by selectively regionally changing the effective optical path lengths when and as needed. The configuration of the faceplate, and hence that of its reflective surface region, at any given time is determined by the action of one or more of typically a large number of actuator devices on the faceplate, and the counteraction of a restoration or spring mechanism of one kind or another. In each case, the respective actuator device exerts an action force on an affected zone or subaperture of the faceplate at least when activated to displace such zone out of its initial position, and the restoration mechanism urges the affected faceplate zone, either directly or via the actuator device, in the opposite direction. When the action force changes at any particular time, the affected faceplate zone is displaced out of its present position with attendant concurrent change in the reaction force, such displacement continuing until the action and reaction forces are in equilibrium again, albeit at a different force magnitude level, in the newly acquired position of the affected zone.

In this context, it is highly desirable if not crucial to assure that the action and reaction forces act on the affected faceplate zone in a substantially coaxial fashion along the centerline of the subaperture that is substantially normal to the reflective surface, to avoid subjecting the faceplate to undesirable force moments resulting in unwanted faceplate stresses and/or distortions. This, however, is not easy to accomplish, especially because the available volume is limited, typically amounting only to a few cubic centimeters.

There are already known many different types of actuator devices capable of providing the faceplate deflection, but they all possess limitations of varying nature. So, for instance, deformable mirrors equipped with metal faceplates are commonly used in high power applications where the capability of the metallic materials to withstand and operate at relatively high temperatures, coupled with their relatively high thermal conductivity making it possible to cool the faceplate by circulating a coolant past the back face of the faceplate, are important if not decisive considerations. On the other hand, metal faceplates have certain disadvantages that directly affect the performance parameters of the various components and have particularly undesirable effects in relatively low power applications. The large mass, high coefficient of thermal expansion, only moderate surfaceability, long term dimensional instability and environmental susceptibility of metals are all known drawbacks encountered when using metallic faceplates.

Traditional glass mirror faceplates avoid a number of these problems, but the materials used therefor are of relatively low strength and/or brittle. These qualities make it very difficult if not impossible to use such faceplates with actuator devices that employ coil springs or diaphragm plates to urge the affected faceplate zones to their initial positions, mainly because of the relatively high tensile stresses that these mechanisms impose on the faceplate.

To avoid such problems, deformable mirrors using faceplates of conventional optical glasses have been built by employing a "sandwich" structure in which the actuator device itself constitutes a stressed link in the structural path of the reaction or restoration force. This structure, however, results in tensile loading of the actuators, which are typically made of ceramic materials possessing very little mechanical strength in tension. The result has been that delamination of multilayr actuators has become a chronic problem in such structures. Moreover, in such a structure, replacement of any actuator that may have been damaged or is in need of replacement for some other reason requires extensive refurbishment of the entire structural assembly of such deformable mirror.

In another typical deformable mirror design in which it is easier to replace the actuators, a relatively large piezoelectric actuator element is inserted through a hole bored in a stiff substrate to make contact with the faceplate of the mirror. In order to this, the hole must be sufficiently large to permit the passage of the actuator element. Since the presence of the holes lowers the mechanical resonance of the substrate, the substrate thickness must be increased to counter the affect of the holes. Since the substrate raw material is usually expensive, this increased thickness is reflected in an increased system cost. Further, the adjusting parts are usually custom made in small batches and are therefore quite expensive.

Accordingly, it is a general object of the present invention to avoid the disadvantages of the prior art.

More particularly, it is an object of the present invention to provide a mirror actuator device which does not possess the disadvantages of the known devices of this kind.

Still another object of the present invention is to develop the actuator device of the type here under consideration in such a manner as to be particularly suited for use in a deformable mirror assembly.

It is yet another object of the present invention to devise a deformable mirror assembly utilizing a plurality of actuator devices of the above type, in which the actuator devices can be easily adjusted.

A concomitant object of the present invention is to design the deformable mirror assembly of the above kind in such a manner as to be relatively simple in construction, inexpensive to manufacture, easy to use, and yet reliable in operation.

A yet further object of the present invention is to construct the mirror assembly and the actuator device of the above kinds in such a manner as to minimize the amount of space occupied thereby and the number of parts employed therein, as well as to minimize the extent of weakening of the substrate or support for the actuators and associated components.

DISCLOSURE OF THE INVENTION

In keeping with these objects and others which will become apparent hereafter, one feature of the present invention resides in an actuator device for controllably adjusting the spacing of a zone of a mirror faceplate from a substrate that has front and back surfaces facing toward and away from the faceplate, respectively, and a passage extending through the substrate substantially normal to the front and back surfaces. This device includes an active element having front and back faces facing toward and away from the back surface of the substrate, respectively, and an openign passing therethrough in extension of the passage, and capable of undergoing dimensional changes when exposed to at least one of electric and magnetic fields. Furthermore, there is provided means for subjecting the active element to compression. In accordance with the present invention, such subjecting means includes an end element juxtaposed with the faceplate zone, resiliently yieldable spring means interposed between the end element and the front surface of the substrate, an elongated preloading element extendign through the passage and the openign and having one end portion secured to the end element to constitute a preloading unit therewith, and another end portion remote from the one end portion, at least the other end portion having an external thread, and tensioning means juxtaposed with the back face of the active element around the other end portion of the preloading element and having an internal thread in meshing engagement with the external thread of the preloading element for deforming the spring means to the extent necessary for the restoring force of the spring means to exert a preload pressure of a desired magnitude to the back face of the active element. The actuating device further includes means for applying to the active element the one field of a controllably variable magnitude for adjusting the spacing to the desired extent.

A particular advantage of the actuator device construction according to the present invention as described so far is that, when the actuator device is used for deforming the faceplate of a deformable mirror, there is obtained a retraction mechanism that imposes relatively low stresses on the faceplate. Another important advantage is that the resulting mirror or similar arrangement is very compact. Also, due to the fact that only the relatively thin actuating element has to pass through the substrate or other support on which the actuator device is mounted when in use, such substrate is not unduly weakened. Moreover, the actuator is easily accessible from the back side of the substrate, for instance for replacement purposes.

BRIEF DESCRIPTION OF THE DRAWINGS

Other features and advantages will be apparent from the specification and claims and from the accompanying drawings, in which:

FIG. 1 is a simplified partly cross-sectioned view of a deformable mirror assembly constructed in accordance with the present invention;

FIG. 2 is a view similar to FIG. 1 but showing only a fragment of the deformable mirror assembly that includes only a few of the actuator devices embodying the present invention in various stages of assembly; and FIG. 3 is a view similar to that of FIG. 2 of a modification that can be used in the mirror assembly of FIG. 1 instead of the construction depicted in FIG. 2.

BEST MODE FOR CARRYING OUT THE INVENTION

Referring now to to the drawing in detail, and first to FIG. 1 thereof, it may be seen therein that the reference numeral 10 has been used therein to identify a deformable mirror assembly constructed in accordance with the present invention. The mirror assembly 10 includes, as its main components, a substrate or support consisting of several parts collectively indicated at 11, a faceplate 12, and a number of actuator devices 20.

The faceplate 12 is flexibl or deformable at least to some extent and has a surface region 13 that is reflective to incoming light or similar radiation. The reflectivity of the surface region 13 is obtained by resorting to any of a variety of known techniques, such as by depositing a reflective coating on the affected major surface of the faceplate 12. The faceplate 12 is made, for instance, of single crystal silicon and its peripheral or marginal portion 14 is supported on and secured to the substrate 11, for instance, by being bonded thereto. The substrate 11 is shown to consist of a substrate plate 15 and a support ring 16 which are held in proper position relative to one another by respective positioning pins 17 or a similar positioning arrangement. The material for the support ring 16 is chosen, among others, for its coefficient of thermal expansion in such a manner as to make the mirror assembly 10 substantially athermalized or, in other words, temperature variation independent. The substrate plate 15 has a number of through passages 18 each for accommodating a portion of one of the actuator devices 20.

Turning now to FIG. 2 of the drawing as a basis for a more detailed description of the construction of one of the actuator devices 20 and its relationship to and cooperation with other components, it is to be mentioned first that, while the actuator device 20 is illustrated, and will be discussed below, as being incorporated or used in the deformable mirror assembly 10, it could also be employed in a variety of other applications in which it is desired to vary the distance of a front end face 21 of the actuator device 20 from a front major surface 36 of the substrate plate 15 or, generally speaking, any similar support. It is also to be mentioned in this context that the expressions "front" and "back" and other words or phrases of the same or similar import are being used herein to denote orientations or directions taken respectively toward and away from the incoming light beam in this application, or any object to be acted upon by the actuator device 20 in other applications.

In the illustrated application, the faceplate 12 and the front end face 21 of the actuator device 20 are mechanically connected with one another, such as by being bonded to each other by a non-illustrated adhesive layer which may be electrically and/or thermally insulating. The front end face 21 is provided on an end cap 22 of the actuator device 20. The end cap 22 also has a rear end face that is shown in FIG. 2 to abut an associated front end face of a resilient Belleville spring or washer 23. The peripheral portion of the Belleville spring 23 is in contact with a front major surface of the substrate plate 15 in an assembled condition of the mirror 10 and of the actuator devioe 20.

Each actuator device 20 further includes an actuator portion that is indicated at 24 and is situated at the back major surface of the substrate plate 15 and in contact therewith in the aforementioned assembled condition. The actuator 24 may be of any known construction, such as laminated, electrostrictive, magnetostrictive, or piezoelectric, the only requirement in this respect being that the distance between the front and rear faces of the actuator 24 be variable in response to application thereto and as a function of the magnitude of mechanical forces, on the one hand, and of electric power or, generally speaking, electric or magnetic field, on the other hand. The actuator 24 has a central opening 25 which, in the illustrated mounted or assembled position of the actuator device 20, is aligned with and forms an extension of the passage 18 of the substrate plate or support 15.

To hold the actuator device 20 together and in its proper mounted position, and especially to apply the aforementioned mechanical (pre-tensioning) forces to the actuator 24, there is provided a tensioning device 26 which includes, besides the end cap 22, an elongated tensioning element 27 having one end portion 28 secured to the end cap 22 and another end portion 29 and passing through and rearwardly beyond the opening 25 and the passage 18, and a tensioning assembly 30 serving to impart the desired tension to the tensioning element 27 and, by means of the latter, the desired axial pre-tensioning force to the actuator 24. To this end, the tensioning element 27 is advantageously a rod of a relatively high-strength material, preferably of a metallic material that is externally threaded either over its entire length, in which case it is secured to the end cap 22 by being threaded into a compatibly internally threaded hole of the end cap 22, or only at its other end portion 29 in which case it is secured to the end cap 22 in some other way, such as by being constructed as a screw or bolt of which the end cap 22 forms an integral head. In either case, the tensioning assembly 30 includes, in the illustrated exemplary construction, an internally threaded member or nut 31 surrounding and meshing with the externally threaded end portion 29 of the tensioning element 27, and a washer 32 interposed between the nut 31 and the back face of the actuator 24.

In the construction illustrated in FIGS. 1 and 2 of the drawing, the support or substrate plate 15 is further provided with a plurality of recesses which open on the back major surface thereof and each of which forms an enlarged section of one of the openings 18, and there is also provided a plurality of pre-tensioning nuts 33 or similar internally threaded elements each of which is received in one of the recesses 19 after having been threaded to the necesary extent onto the externally threaded end portion 29 of the tensioning element 27. At first, as shown at the left side of FIG. 2, the nut 33 is threaded onto the end portion 29 only until it abuts the bottom surface of the recess 19. It should be evident that, when the nut 33 is subsequently turned around the end portion 29 in the tightening direction, it will brace itself against such bottom surface with a force increasing with the degree of tightening. The tensioning force thus imparted to the end portion 29 is then transmitted through the elongated tensioning element 27 and applied via the end cap 22 to the respective Belleville spring 23. Advantageously, the nut 33 is tightened to such an extent that the respective Belleville spring 23 is mechanically pre-tensioned into about the middle of its operating range where its response to additionally applied forces is, for all intents and purposes, linear. This situation is shown on the right side of FIG. 2 of the drawing.

After this procedure is completed, the respective actuator 24 is positioned around the end portion 29 of the tensioning element 27 in the manner illustrated in connection with the central one of the actuator devices 20 appearing in FIG. 2, and the corresponding washer 32 and nut 31 are mounted, in that succession, on the end portion 29. Thereafter, the nut 31 is tightened not only until it confines the washer 32 between itself and the back surface of the actuator 24, but well beyond this point, thus imparting to the actuator 24 a mechanical pre-tensioning pressure that brings the actuator into the middle of its desired operating range where its response is substantially linear. It will be appreciated that, during this tightening process, the axial load is gradually being taken off of the nut 33 until the latter is physically lifted off of the bottom surface of the recess 19, thus arriving at the situation illustrated in the middle of Fiure 2 and throughout FIG. 1, which will be referred to herein as the starting position of the actuator device 20. It should be understood that, after the nut 33 has been relieved of the axial load, the axial pressure exerted by the nut 31, via the washer 32, onto the actuator 24 is attributable solely to the action of the respective Belleville spring 23, via the end cap 22, on end portion 28 of the tensioning element 27, so that the degree of tightening of the nut 31 determines the amount of the pre-tensioning pressure exerted by the tensioning assembly 30 on the actuator 24. It is also shown, in a highly exaggerated manner, in FIG. 2 of the drawing that, as first the nut 33, and then the nut 31, are being tightened, the respective end cap 22 is being drawn closer to the support 15, and with it the faceplate 12, with attendant flattening of the respective Belleville washer 23, resulting in the desired deformation of the faceplate 12 into its starting position.

It will be appreciated that, when the system shown in FIGS. 1 and 2 is being set up, the tensioning elements or rods 27 are assembled with the end caps 22 and passed through the Belleville springs or washers 23, not necessarily in that order, and subsequently inserted into the passages 18. Thereafter, the Belleville springs 23 are compressed by tightening the nuts 33 to achieve a preload compression resulting in flattening of the Belleville washers 23 to the extent of about 50 to 100 micrometers. The exact amount of the compression may vary depending on the properties of the Belleville washers 23 and other factors. An important function of the nuts 33 is to act as stops when the actuators 24 are absent, such as during initial installation or when removed for replacement. With the presence of the nuts 33, there is a limit to the excursion of the end cap 22 and thus to the deformation of the faceplate 12 when the respective actuator 24 is not present.

Once the nuts 33 are in place and properly adjusted, the actuators 24 are slid over the rod 27 and the preload on them is adjusted using the nuts 31. These nuts 31 serve to determine the initial configuration of the faceplate 12 in accordance with conventional adjustment criteria.

As already mentioned before, the actuator 24 is to be subjected to an electrostatic or electromagnetic field to vary its axial dimension (the distance between its front and back faces) relative to that existing initially in the starting position under the aforementioned pre-tension, which means that electric power has to be supplied to the actuator 24. This is diagrammatically illustrated in FIG. 1 of the drawing in conjunction with the rightmost one of the actuator devices 20, by showing a drive 40 having one electric control lead 41.1 that is connected to one end of the actuator 24, while another lead 42.1 that is connected to the other end of the actuator 24 is grounded. As a matter of fact, the drive 40 can be constructed to furnish the electric power required to individually energize any or all of the actuators 24. To this end, the actuator drive 40 further includes a plurality of additional control leads 41.2 to 41.n (with n being the number of the actuator devices 20 to be individually addressed or driven), each being associated and connected, in a manner which has not been illustrated in the drawing in order not to unduly encumber the same, with the other actuators 24. The actuator drive 40 is constructed and operated in any well-known manner to issue individual control or driving signals to its control leads 41.a to 41.n, the magnitudes of such control or driving signals being such as to cause the actuator devices 20 collectively to impart the desired configuration to the faceplate 12 and thus to the reflective region 13 thereof.

Turning now to FIG. 3 of the drawing, it may be seen that it depicts a modification of the construction described above that embodies another facet of the present invention and that can be used in the deformable mirror arrangement 10 of FIG. 1 instead of that illustrated there and in FIG. 2. However, this modification is similar to that described above that the same reference numerals as before will be used therein to identify corresponding components, being supplemented with a prime only where a component performing a corresponding function is structurally different from that described above.

The actuator devices 20 and the tensioning devices 30 used in the modified construction of FIG. 3 are the same as discussed above, as is the drive 40 and the associated electric circuitry. On the other hand, the Belleville springs 23 of FIG. 2 are not being used herein. Instead, there is being used an unitary resilient spring plate 23' which is being supported at regions situated between and at the outside of the actuator devices 20 on and at a distance from the support 15 by means of respective mutually spaced supporting projections 35. The projections 25 are connected to the support 15, on the one hand, and to the spring plate 23', on the other hand, in such a manner that both the projections 35 and the spring plate 23' remain stationary relative to the support 15 at least as movement along the plane of the front major surface of the latter is concerned, such as by being bonded to at least one of such components and/or integral with the other. Yet, each respective region of the spring plate 23' that is situated between the projections 35 can be elastically deformed from its initial positions illustrated on the right side of FIG. 3 to the equivalent of the aforementioned starting position which is shown, in a highly exaggerated manner, on the left side of FIG. 3. Of course, because of the resilient properties of the spring plate 23', this deformation is accompanied by the inducement of internal stresses in the spring plate 23' which are reflected in the generation of a restoring force of the same magnitude but opposite direction than that causing the deformation. It should also be evident that the magnitude of the restoring force is determined by the extent of the deformation of the affected region of the spring plate 23'.

In this modified construction, it is not necessary to employ the nut 33 of FIG. 2 or its equivalent for predeforming the spring plate 23', particularly because the spring plate 23' is rather stiff, that is, it has a relatively high spring constant so that even a small amount of deformation results in a high value of the restoring force. Therefore, the tightening of the nut 31 alone is sufficient to impart the requisite pre-loading pressure to the actuator 24.

As mentioned before, the actuator 24 may be of the piezoelectric, magnetostrictive or electrostrictive type. In an exemplary implementation of the above approaches, the actuator 24 was formed from doped lead magnesium niobate, such as the product commercially available from the AVX Corporation. In an illustrative embodiment, the actuator 24 had a diameter of 6 millimeters and a length of 10 millimeters, the tensioning element 27 was a commercially available number 0-80 threaded rod, and the nuts 31 and 33 were compatible 0-80 nuts.

In operation, when electric power is supplied to the respective actuator 24 from the drive 40, usually under the control of a system controller or a general purpose digital computer, the active (piezoelectric, electrostrictive or magnetostrictive) element of the latter will change its length. Assuming first that the result of the application of the electric power is a lengthening of the active element, the latter will push on the nut 31 and thus cause the tensioning element 27 to retract the faceplate 12 while simultaneously either compressing the Belleville washer 23 or deforming the affected region of the spring plate 23'. When such supply of electric power is diminished or discontinued, the active element of the actuator 24 lessens the force on the tensioning element 27, which permits the retracting force stored in the Belleville washer 23 or in the affected region of the spring plate 23' to push the faceplate 12 back out, until original equilibrium is restored, or a new equilibrium is achieved, between such restoring force and that exerted on the tensioning element 27 by the active element of the actuator 24. It ought to be realized, however, that frequently the actuator 24 will be operated around the center of its operating range, being initially mechanically and/or electrically biased to this central operating point, such that the faceplate 12 will assume its "neutral" position when the actuator 24 is thus biased. Under these circumstances, it is possible to use the respective actuator 24 to displace the affected region of the faceplate 12 either frontwardly or backwardly (up or down as considered in FIG. 1) out of its aforementioned neutral position, thus permitting the affected faceplate region to be deformed into either a convex or a concave shape, assuming that its shape is planar in the neutral position.

FIG. 1 (but, for the sake of simplicity, not the other Figures) of the drawing also shows that a continuous protective sleeve or tube 34 may be accommodated in the opening 25 of each of the actuators 24, surrounding the tensioning element 27, which is typically made of an electrically conductive metallic material, its entire end portion 29 extending from the washer 32 into the recess 19. The tube 34 has electrically insulating properties, thus preventing arcing or other undesirable electrical phenomena from occurring between the element 27 and the actuator 24. Synthetic plastic materials, such as Teflon TM, have been found to be particularly suited for this purpose. Alternatively, the protective sleeve 34 could be replaced by an electrically insulating coating applied to any or all of the internal surfaces of the actuator 24, or even by an electrically insulating coating applied to the external surface of the tensioning element 27 provided that the material of such protective coating does not suffer damage during the tensioning and/or relaxation of the tensioning element 27.

It will be readily appreciated that the invention brings about certain advantages, such as the fact that actuator 24 is under compressive force, not tensile force. As a matter of fact, all of the components of the mirror assembly, except possibly for the bond between the end cap 22 and the faceplate 12, are under compression, thus eliminating the danger of delamination or the like that could occur if such components were subjected to tensile stresses. Furthermore, inasmuch as the passages 18 provided in the substrate plate 15 need only be large enough in cross-sectional area to permit the passage of the relatively thin tensioning elements 27 therethrough, as opposed to a previously encountered situation where these pssages 18 had to be large enough to permit the passage of the actuators 24 therethrough for initial installation or replacement purposes, the structural integrity of the substrate is not compromised and, as a matter of fact, is hardly affected, by the presence of such passages 18, so that the thickness, and hence the weight, of the substrate plate 15 can be kept to a minimum.

Another advantage is that, by using the approach proposed here, there is obtained an actuator to faceplate integration solution that imposes relatively low stresses on the faceplate and simultaneously maintains the structural integrity of the actuator. Furthermore, this proposed design uses or is compatible with traditional optical material and manufacturing processes. Additionally, the use of a single crystal silicon faceplate in conjunction with that of an optical glass substructure and actuation mechanism results in a nearly athermalized mirror assembly.

It should be understood that the invention is not limited to the particular embodiments shown and described herein, but that various changes and modifications may be made without departing from the spirit and scope of this novel concept as defined by the following claims.

I claim:

1. An acuator device for controllably adjusting a spacing taken along an axis between a predetermined zone of a mirror faceplate and a substrate, said substrate having front and back surfaces facing axially toward and away from the faceplate, respectively, and a passage extending axially through the substrate substantially normal to the front and back surfaces, comprising
    an active element having front and back faces facing toward and away from the back surface of the substrate, respectively, and an opening passing axially therethrough to form an extension of said passage of said substrate, and capabel of undergoing dimensional changes when exposed to at least one of electric and magnetic fields;
    means for subjecting said active element to compression, including
        an end element juxtaposed with said predetermined zone of said faceplate,
        resiliently yieldable spring means interposed between said end element and said front surface of said substrate,
        an elongated preloading element extending through the passage and said opening and having one end portion secured to said end element to constitute a preloading unit therewith, and another end portion remote form said one end portion, at least said other end portion having an external thread, and
        tensioning means juxtaposed with said back face of said active element around said other end portion of said preloading element and having an internal thread in meshing engagement with said external thread of said preloading element for deforming said spring means to the extent necessary for a restoring force of said spring means to exert a preload pressure of a desired magnitude to said back face of said active element; and
    means for applying to said active element at least said one of said electric and magnetic fields of a controllably variable magnitude for adjusting the spacing to the desired extent.

2. The actuator device as defined in claim 1, and further comprisign means for connecting the faceplate zone to said end element for joint movement therewith.

3. The actuator device as defined in claim 1, wherein said tensioning device includes a nut having said internal thread, and an annular spacer interposed between said nut and said back face of said active element.

4. The actuator device as defined in claim 1, wherein the substrate has a recess that opens on said back surface of said substrate around the passage to form an enlarged portion thereof and has a bottom surface; and wherein said preloading unit further includes additional tensioning means also having an internal thread meshing with said external thread of said other end portion of said preloading element, said additional tensioning means being accommodated in said recess and operative for engaging said bottom surface thereof to apply a preloading force to said spring means in the absence of said tensioning means.

5. The actuator device as defined in claim 1, wherien said spring means includes a Belleville washer.

6. The actuator device as defined in claim 1, wherein said spring means includes a spring plate disposed between the front surface of the substrate and said faceplate, and means for immovably supporting said spring plate on the substrate at a plurality of locations spaced from the passage for a region of said spring plate that extends between said locations to be resiliently deformable.

7. A mirror assembly comprising
    a mirror faceplate;
    a substrate having front and back surfaces facing toward and away from said faceplate, respectively, and a plurality of passages extending through the substrate along an axis substatially normal to said front and back surfaces; and
    a plurality of actuator devices each for controllably adjusting an axial spacing between an associated zone of the faceplate and the front surface of the substrate, each of said plurality of actuator devices including
        an active element having front and back faces facing axially toward and away from the back surface of the substrate, respectively, and an opening passing axially therethrough to form an extension of the respective passage, and capable of undergoing dimensional changes when exposed to at least one of electric and magnetic fields;
    means for subjecting said active element to compression, including
        an end element juxtaposed with the faceplate zone,
        resiliently yieldable spring means interposed between said end element and said front surface of said substrate,
        an elongated preloading element extending through the passage and said opening and having one end portion secured to said end element to constitute a preloading unit therewith, and another end portion remote from said one end portion, at least said another end portion having an external thread, and tensioning means juxtaposed with said back face of said active element around said other end portion of said preloading element and having an internal thread in meshing engagement with said external thread of said preloading element for deforming said spring means to the extent necessary for a restoring force of said spring means to exert a preload pressure of a desired magnitude to said back face of said active element; and means for individually applying to each of said active elements at least said one of said electric and magnetic fields of a controllably variable magnitude for adjusting the spacings to the desired extent.

8. The mirror assembly as defined in claim 7, and further comprising means for connecting each of said associated faceplate zones to an associated one of said end elements for joint movement therewith.

9. The mirror assembly as defined in claim 7, wherein said tensioning device of each of said actuator devices includes a nut having said internal thread, and an annular spacer interposed between said nut and said back face of said active element.

10. The mirror assembly as defined in claim 9, wherein said substrate has a plurality of recesses that open on said back surface of said substrate around the respective ones of said passages to form respective enlarged portions thereof and have respective bottom surface;s and wherein said preloading unit of each of said actuator devices further includes additional tensioning means also having an internal thread meshing with said external thread of said other end portion of said preloading element, said additional tensioning means being accommodated in the respective one of said recesses and operative for engaging said bottom surface thereof to apply a preloading force to said spring means in the absence of said tensioning means.

11. The mirror assembly as defined in claim 7, wherein said spring means includes a Belleville washer.

12. The mirror assembly as defined in claim 11, said spring means includes a spring plate disposed between the front surface of the substrate and said faceplate, and means for immovably supporting said spring plate on the substrate at a plurality of locations spaced from the respective passages for respective regions of said spring plate that extend between said locations to be resiliently deformable.

13. An actuator device to be mounted in a mounted condition thereof on a support having front and back surfaces and a passage extending axially therethrough substantially normal to the front and back surfaces, comprising an active element having front and back faces facing axially toward and away from the back surface of the support, respectively, and an openign passing axially therethrough to form an extension of the passage in the mounted condition, and capable of undergoing dimensional changes when exposed to at least one of electric and magnetic fields;

means for subjecting said active element in the mounted condition thereof to compression, including an end element having a front face and a back face facing axially away from and toward the front surface of said substrate in the mounted condition, resiliently yieldable spring means interposed between said end element and said front surface of said support, an elongated preloading element extending through the passage and said opening in the mounted condition and having one end portion secured to said end element to constitute a preloading unit therewith, and another end portion remote from said one end portion, at least said other end portion having an external thread, and tensioning means juxtaposed with said back face of said active element around said other end portion of said preloading element and having an internal thread in meshing engagement with said external thread of said preloading element for deforming said spring means to the extent necessary for a restoring force of said spring means to exert a preload pressure of a desired magnitude to said back face of said active element; and means for applying to said active element in the mounted condition thereof at least said one of said electric and magnetic fields of a controllably variable magnitude for adjusting the spacing of said front face of said end element from the front surface of the support of the desired extent.

14. The actuator device as defined in claim 13, wherein said tensioning device includes a nut having said internal thread, and an annular pacer interposed between said nut and said back face of said active element.

15. The actuator device as defined in claim 13, wherein the support has a recess that opens on said back surface of said support around the passage to form an enlarged portion thereof and has a bottom surface; and wherein said preloading unit further includes additional tensioning means also having an internal thread meshing with said external thread of said other end portion of said preloading element, said additional tensioning means being accommodated in said recess and operative for engaging said bottom surface thereof to apply a preloading force to said spring means in the absence of said tensioning means.

16. The actuator device as defined in claim 13, wherein said spring means includes a Belleville washer.

17. The actuator device as defined in claim 13, wherein said spring means includes a spring plate disposed between the front surface of the support and the end element, and means for immovably supporting said spring plate on the support at a plurality of locations spaced from the passage for a region of said spring plate that extends between said locations to be resiliently deformable.

* * * * *